J. M. TRINER.
SCALE.
APPLICATION FILED APR. 6, 1914.

1,203,817.

Patented Nov. 7, 1916.
5 SHEETS—SHEET 1.

WITNESSES:
D. P. Owen
Paul A. Viersen

INVENTOR
James M. Triner
By Felix Stern
ATTORNEY

J. M. TRINER.
SCALE.
APPLICATION FILED APR. 6, 1914.

1,203,817.

Patented Nov. 7, 1916.
5 SHEETS—SHEET 3.

WITNESSES:
OQ Svem
Paul A. Niesen

INVENTOR
James M. Triner
BY Felix Stern
ATTORNEY

J. M. TRINER.
SCALE.
APPLICATION FILED APR. 6, 1914.

1,203,817.

Patented Nov. 7, 1916.
5 SHEETS—SHEET 5.

WITNESSES:

INVENTOR
James M. Triner
By
ATTORNEY

UNITED STATES PATENT OFFICE.

JAMES M. TRINER, OF CHICAGO, ILLINOIS.

SCALE.

1,203,817.  Specification of Letters Patent.  Patented Nov. 7, 1916.

Application filed April 6, 1914. Serial No. 829,903.

*To all whom it may concern:*

Be it known that I, JAMES M. TRINER, a citizen of the United States, residing at Chicago, in the county of Cook and State of Illinois, have invented a new and useful Scale, of which the following is a specification.

This invention relates to weighing machines and especially to platform scales which are adapted for weighing in rapid succession a large number of articles the weight of which may vary between wide limits. A scale of this kind for instance may be particularly useful in offices for carriers of merchandise where the weight as well as the size of packages to be weighed varies between wider limits than in stores handling only a certain line of goods. In offices of this kind it is also essential that the time necessary for ascertaining the weight of each package to be shipped should be very short, as at certain times of the day or certain seasons of the year, the number of transactions is so large, that a very short period can only be allowed for weighing of each single package.

The objects of the invention are to provide a scale wherein the construction of the frame is greatly simplified as compared with frame construction for scales on the market.

Another object is to decrease the weight of a scale of this kind by making the frame of relatively light material, like sheet metal, and to bend this sheet metal into a shape which will impart great rigidity to the frame of the scale.

Another object of the invention is to provide a scale wherein the beam is disposed with respect to the frame in such position that parcels of a great variety of shapes and sizes may readily be placed on the platform and be removed therefrom, the platform being the highest portion of the frame.

Another object of the invention is to dispense with the check rods which were used in platform scales for preventing engagement of the supporting members for the platform with portions of the scale levers. These check rods usually were placed below the platform and it was difficult to connect the rods with the platform and frame after the platform had been placed in position.

Another object is to improve the construction of the beam of scales of this kind by making the beam of sheet metal and by placing the means for adjusting the momentum of the beam in a hollow space of the beam where it is not readily accessible for unauthorized adjustments or for adjustment without the aid of a suitable tool.

Most of the platform scales of known construction had cast metal frames and the principal parts also were made of cast or wrought iron. If any of the parts for some reason had to be replaced it was extremely difficult to obtain a duplicate of the worn out part and in these prior scales therefore a breakage of a scale lever or the beam frequently rendered the entire scale useless. Pressed or punched sheet metal parts, however, can be duplicated exactly by modern shop methods, so as to avoid any difficulty in replacing a worn out or broken part in case of emergency.

A principal advantage of the novel construction also rests in the three point connection between the scale beam and the scale levers in contradistinction from the four point suspension in general practice. Owing to this three point suspension the distance between the scale beam and the pivot nose can be shortened considerably, and a suitable adjustment of the pivot nose may be effected without having any detrimental effect on the adjustment of the scale beam.

Another advantage also rests in the support of the knife edges in the wall portions of the scale levers, a support which cannot be put to practice wherever the scale levers are made of solid bars.

Other improvements may be seen in the novel construction of the slidable poise provided with means for holding the adjusting weights within the poise in central position with respect thereto whereby the center of gravity of the poise will have a permanent relation to that element of the poise which serves for releasably securing the same by gravity in a notch of the scale beam. This centering element of the poise is so constructed with respect to the shape of the notch, as to maintain also a permanent angular relation between the points of engagement of said element with the wall of the notch, and the center line of the notch.

With these and other objects in view I have illustrated an embodiment of the invention in the accompanying drawing and have described the same in the following specification.

In the drawing

Similar parts are indicated in the different views by similar reference characters.

Most of the scales on the market and especially most platform scales have cast iron frames or frames made of some other casting. It is necessary in devices of this kind that they should be placed in exactly horizontal position and for this reason it has been necessary to machine the frame of the scale or to provide it with adjustable feet. The present scale, however, has a frame of sheet metal preferably sheet steel. The frame as a whole being indicated at 1 comprises two lateral walls 2 and two end walls 3, a bottom plate 4 and a removable top cover 5. The end walls and lateral walls of the frame preferably have the cross-section of channels as shown, the narrow flanges 6 of these channels extending inwardly at a right angle from the walls 2 and 3. The strength of the walls and the rigidity of the entire structure is greatly increased by the provision of the flanges 6. This rigidity is still more enhanced by additional corner pieces or angles 7 which extend from each lateral wall to the adjoining end wall and are secured to the outside of the frame in some suitable way as for instance by rivets 8. The connection of these corner pieces 7 with the frame is strengthened by the provision of top and bottom extensions on the corner pieces or angles 7, said extensions overlying the flanges 6 of the wall members of the frame at the corners of the same and being united with said flanges, as for instance by welding.

In spite of the lightness of this frame structure the rigidity of the same is sufficient to withstand the severe and frequent strains to which a device of this kind is subjected. The manufacture of the box-like frame of sheet metal results in the advantage that by the appliance of modern shop methods a level position of the frame may be attained without making it necessary to machine any parts of the same after the various elements of the frame have been assembled.

The weighing levers within the frame and which are provided with knife edges to support the platform are suspended by means of rods which extend transversely through the frame and which are rigidly secured thereon. These rods 10 as may be seen in Fig. 2 comprise a reinforced center portion 11 having a length of substantially the width of the interior of the frame. Adjoining this central reinforced portion of the rods the same are provided with a bearing portion 12 for the links which serve for carrying the short and long member respectively, said members being interconnected near the center of the scale as is well known from the art. The bearing portions 12 are somewhat longer than is necessary for the width of the links so as to allow sufficient play laterally for these links. The lateral movement of these links is limited in one direction by the shoulder 13 while on the other end it is limited by a nut 14 on the threaded portion 15 of the rod 10. The nut is forced against the shoulder between the threaded portion 15 and the bearing portion 12, by means of a sleeve 16 which is provided with an internal thread and which extends through the wall of the frame 1 of the scale. This sleeve is provided on its end frame with a suitable head 17 which facilitates the manipulation of said sleeve by means of a wrench or the like.

From the above it will be seen that the two suspension points for each lever are fixed in their relation to the frame and that the rods from which these members are suspended are rigidly secured in place within the frame. The heads 17 of the sleeves preferably engage the angles 7 and therefore have a tendency to force these angles still more into engagement with the respective wall of the box.

Links 18 depend from the bearing portions 12 of the rods and are provided with eyes or loops at their lower end. These eyes or loops serve as bearing portions for the knife edges 19 which are fixedly secured in the pertaining end of the scale levers.

The bodies or scale levers are constructed in the form of bifurcated members which are suspended from the knife edges 19, adapted to oscillate about these edges and to transmit the movement to the beam disposed in front of the frame.

In the construction of scales it is necessary to impart great rigidity to the scale levers, as the load on the platform acting upon these levers will have a tendency to cause deformation of the same. A part of the weight on the platform would then be utilized for this deformation without acting on the scale beam. In most of the known constructions the scale levers were therefore made in the form of solid bars or rods to avoid distortion or springing of the same. The construction of these levers in the form of solid rods or solid bars rendered them relatively heavy and the entire construction of the scale therefore was very cumbersome. In the improved construction these members are held very rigid, the weight, however, is greatly reduced as compared with known scale levers of corresponding size and capacity.

Figure 1:
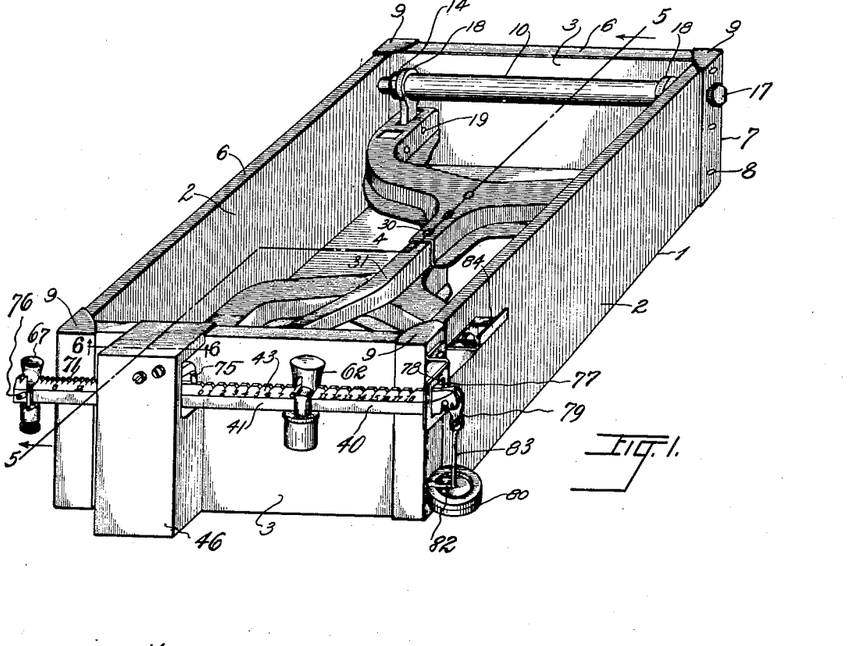
Figure 1 is a perspective view of a platform scale of this kind, the platform and the cover for the scale box being removed to show the arrangement of the scale levers.
Figure 2:
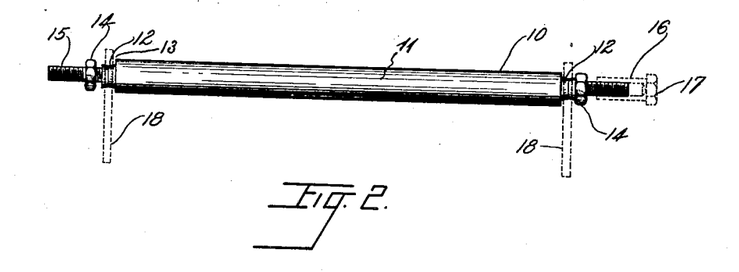
Fig. 2 shows the suspension rod for the levers, the connecting links between the rod and the levers being indicated in dotted lines.
Figure 3:
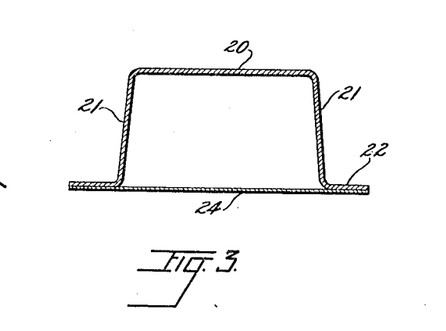
Fig. 3 is a cross-section through one of the levers.
Figure 5:
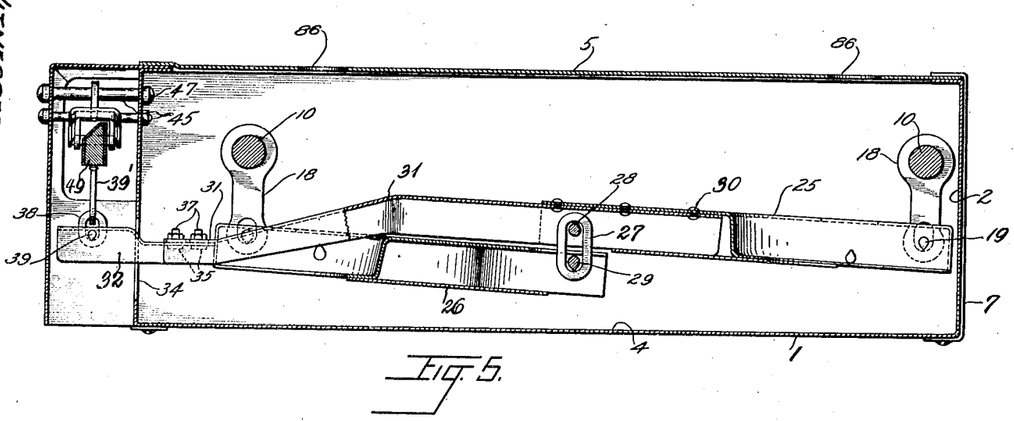
Fig. 5 is a vertical section through the scale on line 5—5 of Fig. 1.

The scale levers have the cross-section of an inverted channel (Fig. 3) provided with a bottom wall 20 lateral walls 21 and flanges 22 extending laterally from the said walls of the channel in a direction away from the axis of the same. A lever having a cross-section of this kind has great resistance against deformation by bending or twisting or, in general, it has a very great momentum of inertia as compared with other structures containing the same mass of material. The security against bending or springing of the levers under load placed on the platform is still increased by applying to the open side of this channel shaped lever a closing member whereby the cross-section of the lever is converted into a box shaped cross-section. For this purpose a plate of substantial crescent outline is secured to the bight and the two prongs of the bifurcated levers, preferably by welding the said plate 24 to the flanges 22 of the levers. The two scale levers 25 and 26 are interconnected by means of a link 27 of known shape which engages knife edges 28 and 29 secured to those parts of the two levers which are in superposition near the center of the scale. The upper one of the levers is connected by rivets 30 or the like with a gooseneck extension 31 (Figs. 2 and 5). This extension preferably also has a box or channel shaped cross-section so that the stiffness of the entire lever structure equals the stiffness of a structure in which solid levers of the same cross-sectional area would have been used. A second extension or pivot nose 32 projects through the front wall of the frame wherein an aperture 34 is provided which allows said pivot nose to move up or down. The pivot nose 32 is adjustably secured to said first named extension 31 by means of screws 35 (Fig. 9) held within the channel shaped pivot nose 32 and projecting through longitudinal slots 36 in the extension 31 whereby an adjustment of one of these extensions with respect to the other extension is rendered possible. After the parts have been adjusted to proper position they are locked in their relation by nuts 37 on the screws 35. A link 38 engages a knife edge 39 mounted in the projecting end 33 of the pivot nose, and is connected by means of another link 39' with the beam 40 which is mounted adjacent the front wall of the box.

Figures 6, 7, 8, 9, 10:
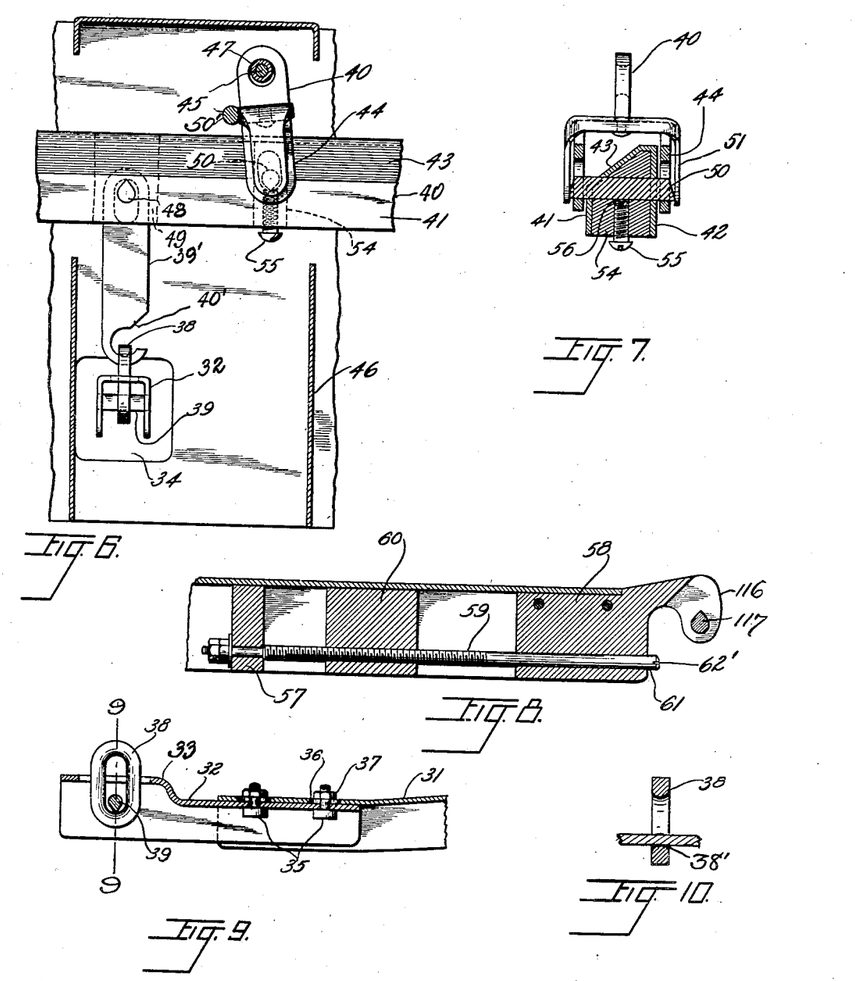
Fig. 6 is front view of the suspension for the scale beam and its connection with the levers, the figure being a section on line 6—6 of Fig. 1.
Fig. 7 is a cross-section through the beam showing the means for suspending the same pivotally with respect to the frame.
Fig. 8 is a detail sectional view showing the means for adjusting the momentum of the beam.
Fig. 9 is a sectional view through a part of the levers illustrating the means for adjusting the pivot nose with respect to the lever.
Fig. 10 is a sectional view through a link on line 10—10 of Fig. 9.
Figure 11:
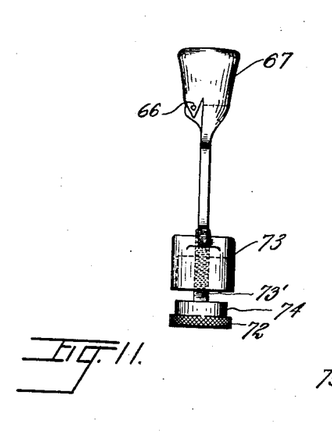
Fig. 11 is an elevation and partly a sectional view of a poise.

By reference to Figs. 5 and 6 it may be seen, that the link 39' leading from the pivot nose 32 to the beam is open near its lower end, as shown at 40'. The upper end of the said links is closed about a knife edge secured in the beam. This construction renders it possible to detach or remove the scale beam from the scale, without requiring removal of the pivot nose or scale levers, and on the other hand the pivot nose, or even the scale levers may be removed from the scale, without making it necessary to detach the beam from the scale.

The closed link 38 is swaged of solid material and is provided with wall portions of convex curvature as indicated at 38'. One of said curved wall portions will be in engagement with the knife edge 39 of the pivot nose, when the parts are assembled, and the other wall portion will be in interlinking engagement with a similarly curved portion of the link 39' which is movably secured to the beam. By causing engagement of these hardened links on convex surface portions the friction is reduced to a minimum and all of the parts have a maximum freedom of movement.

In the construction of the beam use is made again of the principle of replacing the ordinary solid material beam by a member having a cross-section similar to the cross-section of known beams but consisting of sheet metal pressed into suitable shape. This shape provides two straight guiding surfaces for the poise as indicated at 41 and 42, and one inclined surface 43 connecting the first named surfaces and provided with graduation marks whereby the respective position of the poise on the beam may readily be read by the operator of the scale.

In contradistinction from the known platform scales the weighing beam is arranged preferably at a level below the level of the platform so that the platform itself forms the highest portion or element of the scale and no other parts project above the same. This facilitates the handling of merchandise on the platform and enables the operator to place large and small articles on the same, or to remove them therefrom without incurring any danger of interference with the upright, which in most scales connects the frame with the weighing mechanism or beam proper. The beam 40 is suspended in front of the platform casing from a link 44 which is held in position by a bolt 45. This bolt passes from the front wall of a hood or additional casing 46, secured to the box 1, to the front wall of the said box and is secured by a nut resting against the inner surface of the front wall of the box. A displacement of the link 44 in axial direction on the bolt 45 is prevented by spacing members in the form of sleeves 47, one of said spacing members being inserted between the link 44 and the front wall of the casing 46 and the other spacer being interposed between the link and the front wall of the box 1. By this means the beam is held against axial displacement with respect to the pivot bolt 45 and can only oscillate in a vertical plane. The link 39' engages at its upper end a knife edge 48 securely mounted as by riveting or the like in the hollow of the beam 40. The free length of this knife edge within the hollow space of the beam is reduced by the insertion of a lining member 49 which fits the inner space of the beam. The lining member 49 may be connected with the beam by soldering, welding, brazing or the like. The link 44 on which the beam is suspended by means of the fulcrum knife edge 50 is partly covered by an outer member or cap 51 which is forced over the link 44.

By reference to Fig. 7 it will be seen that the ends of the fulcrum knife edge 50 loosely projecting through the lateral portions of the link 44 engage the inner wall surface of the cap 51. By this means the depending portions of the link 44 remain spaced from the surfaces 41 and 42 of the beam, and are maintained in permanent engagement with those portions of the knife edge 50 which project from the beam. It will also be seen that a three point suspension is provided for the beam and the scale levers. The link 39' extending from the pivot nose to the beam embraces the knife edge which is secured in the beam and engaging said knife edge at about its middle between the two points on which it is secured to the metal of the beam. The other two points of this triangular suspension are formed by the points where the yoke or link 44 engages the projecting portions of the fulcrum knife edge 50. This three point suspension has the advantage that the pivot nose may be somewhat adjusted forward and backwardly without, however, materially influencing the location of the beam itself. In known scales any sliding adjustment of the pivot nose caused a swerving of the beam with respect to the supporting yoke so that the beam had to have considerable lateral play within the loop through which its front end projected. By locating one point of this triangular suspension within the hollow interior of the beam adjustments of the pivot nose will not greatly affect the location of the beam, and the latter will therefore remain substantially in central position. The yoke 44 is constructed as a self-locking hanger as is well known in the art imparting a tendency to the beam to swing backwardly toward the stop rod 50' unless a load is placed on the scale.

The knife edge 50 is securely held in the beam by means of a block 54 which is forced into the hollow of the beam and secured therein in some suitable way. The knife edge 50, after having been forced through the block 54 cannot be secured in place by riveting or the like, similar to the manner, in which other knife edges in the scale levers or in the beam are secured. It may be forcibly retained in position by means frictionally engaging the edge, as shown in Fig. 7. A screw 55 extends through a tapped aperture provided in the block 54 and is adapted to force a cushion 56 of soft metal, like copper in direction toward the knife edge 50, whereby the latter is held against lateral displacement within the block 54.

The means for adjusting the moment of the beam with respect to the fulcrum knife edge 50 in the present case are placed within the interior of the beam, in contradistinction from the known scales, wherein an adjusting "rider" is usually mounted on top of the beam and supported thereon by suitable standards. This has the disadvantage that either intentionally or unintentionally the position of the rider may be shifted and that thereby the moment of the long arm of the beam with respect to its fulcrum may be varied. The adjustment of the moment of the beam is effected in the improved construction shown herewith in the following way: Near the free end of the beam and at a certain distance from each other two blocks 57 and 58 are securely held in position and serve as bearings for a screw spindle 59 which is rotatable within said bearings and which is held against longitudinal displacement therein, as for instance by means of nuts engaging the block 57. A rider weight 60 provided with internal threads is movably mounted on the spindle 59. It is obvious therefore that by rotating the spindle the distance of this slidable weight 60 from the fulcrum edge 50 may be varied and that thereby the moment of the beam with respect to this fulcrum may be changed whereby it is possible to counterbalance exactly the dead weight of the lever system and platform. The spindle projects at 61 to a slight extent from the free end of the beam and is provided with a slot 62' at this end adapted to receive the end of a screwdriver. It is obvious therefore that a rotation of the spindle cannot be effected without using some implement and that an unintentional displacement of the rider weight 60, or an unauthorized tampering with the beam cannot take place as readily as in the scales of known construction.

Figure 12:
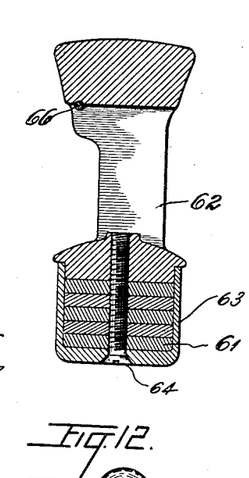
Fig. 12 is a similar view of another poise used on the beam.

The larger poise 62 is a substantially cylindrical body of metal adapted to slide on the beam 40 and provided for this purpose with an aperture the outline of which corresponds approximately to the outline of the cross-section of the beam. A cup shaped element 63, Fig. 12 is centrally secured by means of a screw 64 to the upper or lower part of the poise and disks 61 or other weight elements may be inserted into the cup to bring the poise up to the proper weight. By this means the center of gravity of the poise will be maintained in permanently fixed relation with respect to the axis of the poise. In known sliding weights, gun shot or similar loose material was used for bringing the weight of the poise up to the desired value. When the poise then was shifted these loose weights changed their position, whereby the location of the center of gravity of the poise also shifted. This disadvantage is avoided in the present construction, wherein the additional weights 61 are held centrally. It is also to be noted that the cup shaped holder 63 can only be removed by loosening the flat headed screw 64 and this again can only be effected by means of a screw driver or similar tool. If an attempt is made to loosen the cup by applying a wrench or the like to the outer surface thereof, the wall of the cup will be forced inwardly and this will have a tendency to press the holding screw 64 still more into engagement with the tapped aperture in the poise.

The upper edge of the beam is provided with a plurality of notches 65 equidistant from each other and a transverse element in the form of a wire 66 driven transversely through the poise enters these notches when the poise is placed in proper position. By these means the poise owing to its own weight will readily fall into one of these notches and will be releasably held therein to afford a means for rapidly bringing the beam into equilibrium in accordance with the load placed on the platform.

Figure 13:
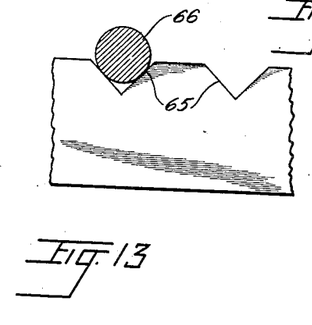
Fig. 13 illustrates diagrammatically the means for maintaining the poise in adjusted position.

From Fig. 13 it will be noted that the notches are triangular or V-shaped. The holding element 66 of the poise has circular cross-section, so that two points of engagement between the holding element 66 and the notch are provided. Even if the parts should become worn, the relation of these points of engagement with respect to the central portion of the notch would still be the same, that is, a vertical line drawn through the central portion of the notch will pass midway between these points of engagement. A similar poise 67 but of smaller weight is slidably mounted at the same end of the beam with respect to the fulcrum 50 on which the lever system is connected with the beam. This smaller poise 67 is also adapted to be releasably held in triangular notches 71 and serves for weighing smaller units than those which may be weighed with the larger poise; it also serves for placing the beam in exact position of equilibrium, by adjusting first the large poise to one of the notches 65 and then the smaller poise to one of the notches 71. The smaller poise also may be provided with means for adjusting the exact weight of the same, said means also comprising an inverted cup shaped element 73 integral with the poise and closable by the head 72 of a screw 73'. The inner end of this screw is enlarged to prevent withdrawal of the same. Circular weight elements 74 may be held in central position within the cup 73 by the screw 73'.

A stop 75 in the path of the poise 60 limits the movement of said poise in direction toward the fulcrum 50, while a smaller stop pin 76 at the end of the beam prevents the withdrawal of the smaller poise 70 from the beam.

The end of the beam 40 swings within an aperture 77 of the bracket 78 riveted, or secured in some other suitable manner, to a wall of the box, this bracket also serving for limiting the movement of the large poise away from the fulcrum 50. The approximate central position of the beam within the aperture 77 indicates that the beam is in equilibrium and that the article resting on the platform has the weight which then may be indicated by reading the position of the poises.

Figure 14:
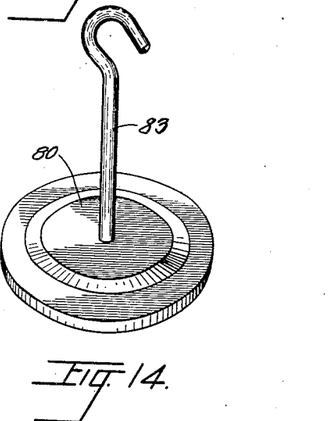
Fig. 14 is a sectional view through one of the extension weights.
Figure 15:
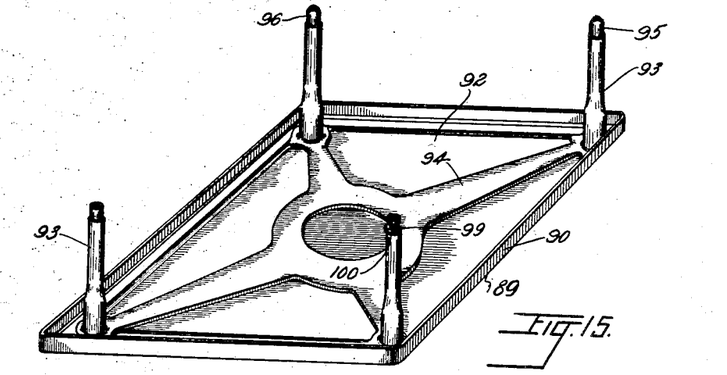
Fig. 15 is a perspective view of the platform as seen from the lower side to show reinforcements of the same.

The beam 40 projects through the aperture 77 and is at its outer end provided with a loop shaped link 79 to which one or more extension weights 80 may detachably be secured. These extension weights also are constructed in a manner different from the ordinary construction of weights of this kind inasmuch as they are punched from steel plates and therefore need less finishing operations than cast weights. The latter in order to be balanced exactly, must be either reduced in size by drilling holes in the same or they must be ground in a certain way. The improved extension weights 80 are formed in the shape of circular disks Fig. 14 provided with a radial slot 82 which makes it possible to place these weights one on top of the other into central position with respect to the hook 83 to which one of the weights is secured. When the extension weights are not in use they are supported on the bracket 84 which is fastened to a lateral wall of the box either by rivets or which may be secured thereto by the head 17 of the sleeve which also serves for fastening the suspension rod 10.

The open box frame of the scale may be closed by a removable cover 5 which is provided with apertures 86 through which the legs of the platform 89 extend. By this means the lever system of the scale is well protected against the entrance of dust and other impurities which might be adapted to impair the exactness of the weighing and which may have a detrimental influence on the sharpness of the knife edges. In most of the scales on the market the platform serves as a means for covering the box frame of the scale but the lightness of the frame in the present structure permits to place a cover on the frame itself, without increasing the height of the frame. The platform 89 also is constructed of sheet metal and provided with depending flanges 90 which protect the edges of the platform and at the same time prevent the entrance of dust between the platform and the cover.

Legs depend from the reinforcing plate 92 of the platform, said reinforcing plate being provided with suitable corrugations 94 to impart rigidity and stiffness to the entire structure. The legs 93, preferably of circular cross-section are provided at their lower ends with feet 95 or steel extensions which may be notched at their free end as indicated at 96 or which may be held plane. In order to adjust the length of these legs and to provide a square support for the platform one of the feet or steel extensions is threaded as indicated at 99 and the distance of the supporting end or steel foot from the end of the tubular member may be varied so that four points of the platform will squarely rest on the four knife edges of the scale levers. The adjustable foot may be secured in its proper position by a lock nut 100, which rides on the threaded portion of this extension and which will secure the threaded member in its adjusted position.

Figure 4:
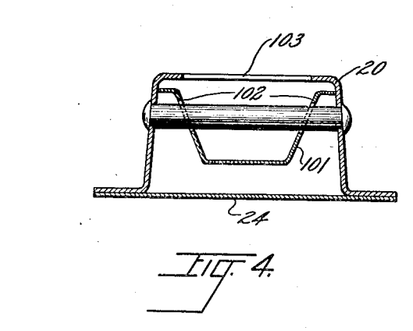
Fig. 4 is a similar cross-section showing a lever and the means for centering the platform with respect to the knife edges of the lever and for preventing said platform from coming into contact with other portions of the lever.

In most of the platform scales on the market check rods are provided between the frame of the scale and the platform proper to secure the platform against excessive lateral vibration or oscillation on the knife edges and to prevent the supporting members of the platform, that is the legs from coming into contact with other portions of the scale levers, but the knife edges. If the weight on the platform should be transmitted to parts different from the knife edges, the exact weight could not be accurately read on the beam. The check rods which were used for holding the platform from contact with parts of the scale levers were interposed between the top of the frame and the lower surface of the platform. The connection between these two parts could only be effected with difficulty as the interspace between platform and frame usually was held as low as possible. In the present construction of a scale these check rods are dispensed with and an oscillation laterally with respect to the knife edges, as well as a contact of the tubular legs or feet extensions with the scale levers is prevented by means inserted in the interior of the scale levers. These means in their present form consist of clips held frictionally against the walls of the scale levers as indicated at 101, Fig. 4 and being provided with apertures 102 through which the knife edges extend. The distance of the two lateral walls 102 of the clip is somewhat smaller than the width of the aperture 103 in the upper wall of the channel shaped scale lever through which the legs of the platform extend. By this means the contact portion between the feet of the platform and the knife edge is continuously held centrally with respect to said knife edge and the platform is automatically dropped and secured in this central position whenever it is connected with the scale.

In order to facilitate the computing of prices for the article to be weighed or of charges to be made for shipping a certain article over a certain distance, a chart 110 is movably connected with the frame 1 of the scale. In the construction shown (Fig. 16) this chart is mounted on a sheet metal slide 104 which is provided with a suitable flange 105 serving as a handle for the slide. The chart contains in the left hand column successively increasing notations of weights and adjacent each of said notations the table is provided with a line giving the charges for sending said weight to a certain zone. The demarcation of the zones preferably is provided on a stationary part of the frame of the scale and in the present instance these marks are shown at 106 near the front edge of the cover. If, for instance, a parcel weighing 5 lbs. is to be shipped to the sixth zone, the operator removes the chart by sliding it out from the pocket 109, provided for this purpose in the top cover of the frame, until the demarcation of the weight 5 is adjacent the front edge of the top cover. The operator then reads the charge given for this weight in alinement with the demarcation of the zone 6, finding thereby the exact price, which is to be charged for the shipment of the parcel.

Figure 17:
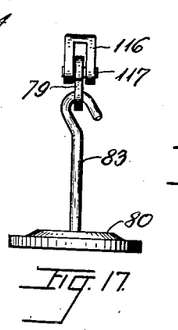
Fig. 17 is an end view of the scale beam with a pending weight attached.

By reference to Fig. 17 it will be noted that the hook 83 rigidly connected to the extension weight 80 is held by the link 79 which is centrally supported from the knife edge, the ends of said knife edge being held by the prongs 116 at the bifurcated free end of the beam 40. By this means the extension weights are also centrally supported with respect to the longitudinal axis of the beam.

Figures 16, 18:
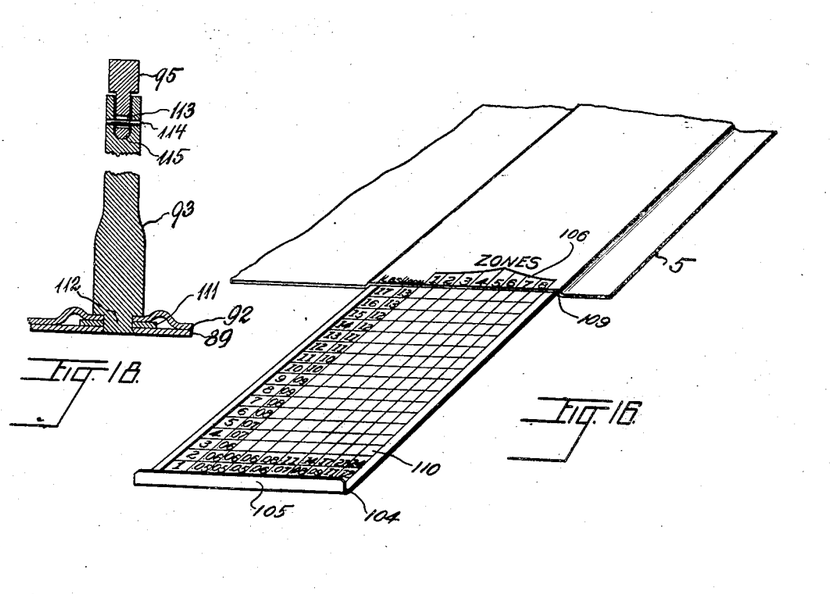
Fig. 16 shows a computing chart in combination with certain parts of the frame which facilitate the reading of the values on said chart.
Fig. 18 is a section through a platform leg and a portion of the platform.

The attachment of the legs to the platform and the connection of the steel extensions 59 with the legs is illustrated in section in Fig. 18. The leg is provided with a narrow portion 112 which is riveted to the platform 89 and to the reinforcing plate 92 a washer 111 being inserted between the platform and the circular bead on the reinforcing plate in order to secure the leg in upright position on the platform.

The extension 95 is loosely secured to the leg by means of a pin 114 which is fitted into suitable apertures of the leg, but it has play in the aperture 113 of the extension 95 through which it projects. The lower end of this extension rests on a spherical surface indicated at 115 so that the same may adjust itself with respect to the knife edges on which it rests. The face of the extension or the V-shaped notch will thereby be brought into engagement with the knife edge on a substantial portion of the length of the knife edge.

It is evident that changes in and modifications of the construction herein described may be made without departing from the spirit of my invention.

I claim:

1. In a scale the combination of a plurality of scale levers, a scale beam, a sheet metal box inclosing said scale levers, reinforcing angle pieces rigidly secured to the outside of said sheet metal box and foot and top portions for said box integral with said angle pieces.

2. In a scale the combination of a plurality of scale levers, a scale beam, a member supporting the fulcrum for that scale beam, a connecting link between said scale beam and one of said scale levers, a sheet metal box for said scale levers, and a common housing for said connecting link and said supporting member; said scale beam being provided with graduations extending from both of its ends inwardly to a portion adjacent the fulcrum of said scale beam, said common housing inclosing the portion of said scale beam which is free of graduation marks, while the portions of said beam provided with said marks project from said housing at both sides of the same.

3. In a scale the combination of a plurality of scale levers, a scale beam, a connecting link between said scale beam and one of said scale levers, a sheet metal box inclosing said scale levers, said sheet metal box having lateral and end walls and bottom and top closure, and a housing mounted on said sheet metal box for said connecting link, the housing being open at the bottom.

4. In a scale the combination of a plurality of scale levers, a frame surrounding said levers, suspension rods for the levers detachably secured to opposite walls of the frame, and links connecting said levers with said suspension rods, the rods being provided with a bearing portion for engagment with said links.

5. In a scale the combination of a plurality of scale levers, a frame surrounding said levers, suspension rods for the levers secured in opposite walls of the frame, and links connecting said levers with said rods, the rods being provided with means for limiting lateral movement of the links with respect to the rods.

6. In a scale the combination of a plurality of scale levers, a frame surrounding said levers, suspension rods secured in opposite walls of the frame, and links connecting said levers with said rods, the rods being provided with shoulders for limiting the lateral movement of the links on the rods.

7. In a scale the combination of a plurality of scale levers, a frame surrounding said levers, suspension rods secured to opposite walls of the frame, and links between said levers and said rods, said rods being provided with enlarged central portions forming shoulders at the edge of the bearing portions for the links.

8. In a scale the combination of a plurality of scale levers, a frame surrounding said levers, suspension rods secured in opposite walls of the frame, links connecting said levers with said rods, enlarged central portions on said rods forming shoulders with the bearing portions for said links, the rods being provided with threaded extensions adjacent the bearing portions, and nuts on said threaded extensions forming stops for limiting the lateral movement of said links.

9. In a scale a plurality of scale levers, a frame surrounding said scale levers, suspension rods secured in opposite walls of the frame, links extending from bearing portions on said rods to said levers, threaded extensions on said rods adjacent said bearing portions, stops mounted on said threaded extensions for limiting the lateral movement of the links on the bearing portions, and threaded sleeves in engagement with said threaded extensions and projecting through the walls of the frame.

10. In a scale the combination of a plurality of scale levers, a sheet metal box surrounding said levers, corner reinforcements for said box, suspension rods extending through the frame, links between said levers and said rods, and means for securing said suspension rods to the walls and to the corner reinforcements of said box.

11. A scale lever comprising a lever portion having a channel shaped cross-section and a reinforcing plate bridging the walls of the channel.

12. A scale lever having a U-shaped cross-section including a knife edge, supported within the lateral walls of the box, and a reinforcing plate covering said knife edge.

13. In a scale lever, consisting of sheet metal and having a channel shaped cross-section, flanges extending laterally from the walls of the channel and a plate rigidly secured to said flanges.

14. In a scale lever consisting of sheet metal and having channel shaped cross-section, flanges extending outwardly from the walls of the channel and a bottom plate welded to said lateral flanges of the channel.

15. A scale lever comprising a central portion and a bifurcated portion extending from said central portion, the lever consisting of sheet metal having channel shaped cross-section, and a crescent shaped reinforcing plate attached to the open face of said bifurcated portion.

16. A scale lever consisting of sheet metal, having a central portion and a bifurcated portion, and an extension secured to said central portion and having a cross-section which fits into an inner hollow space of said central portion.

17. In a scale lever consisting of sheet metal and having a central portion and a bifurcated portion, the cross-section of said lever being trough shaped, a goose-neck extension riveted to said central portion and fitting into the same, substantially as described.

18. In a scale lever consisting of sheet metal and having a central portion and a bifurcated portion, an extension fastened to said central portion, and a pivot nose adjustable with respect to said lever.

19. A bifurcated scale lever having a bifurcated portion and a central portion extending from the bight of said first named portion, an extension on said central portion, a pivot nose adjustable with respect to said extension, and a knife edge secured to said adjustable pivot nose.

20. In a scale lever made of sheet metal and having a bifurcated portion and a central portion extending from the bight of said bifurcated portion a pivot nose slidably mounted on said extension at a level lower than the level of the bifurcated portion.

21. A scale lever having a bifurcated portion and a central portion extending from the bight of said bifurcated portion in a direction opposite to the prongs of the fork, a pivot nose slidably mounted on said extension at a level lower than the level of the bifurcated portion, said pivot nose being provided with means for attaching the same in any predetermined position, and a knife edge centrally located with respect to said pivot nose.

22. A scale lever made of sheet metal and having a bifurcated portion and a central portion, comprising an extension secured to the central portion, a pivot nose slidably mounted on said extension, a plurality of slots in said pivot nose, the extension being provided with apertures adapted to register with said slots and screws extending through said apertures and said slots for locking the pivot nose in adjusted position with respect to the extension.

23. A scale lever comprising in combination a lever portion consisting of sheet metal of channel shaped cross-section and a pivot nose of channel shaped cross-section slidably inserted in the interior of the channel of the scale lever.

24. In a scale beam having a hollow inner space, a knife edge fulcrum extending through the hollow inner space and projecting from the walls of said beam, a bearing block for said knife edge mounted in said beam and a pivot yoke movably attached to the projecting ends of said knife edge.

25. In a scale, a scale beam provided with a knife edge, a yoke extending from the knife edge, a bolt from which said yoke is suspended and means for preventing an axial displacement of said yoke on the bolt.

26. In a scale, a scale beam, a suspension member for said scale beam, a link connecting said suspension member with the beam, and sleeves on said suspension member engaging said link from opposite sides to prevent lateral displacement of the beam with respect to the link.

27. In a scale the combination of a frame, a scale beam, a pivot for the beam, a housing for the pivot and means coacting with the frame and housing for preventing the lateral displacement of the beam on said pivot.

28. In a scale the combination with a scale beam, having a plurality of triangular notches, a poise slidable on said beam and a circular member inserted into the poise and adapted for engagement with any of the triangular notches on the beam, the body of said poise projecting above and below said beam, the circular member being driven through the upper body portion of the poise.

29. In a scale the combination of a beam provided with a plurality of notches, a poise slidable on the beam and means for detachably securing said poise on said beam, said means consisting of a wire of circular cross-section driven transversely through the poise.

30. A poise for a scale comprising a poise body and a cup shaped member detachably connected with said poise body for holding additional adjusting weights, said cup shaped member closely surrounding said weights.

31. A poise for a scale comprising a poise body, a detachable cup connected with the poise body and means for holding additional weights within said cup in central position, said cup closely surrounding said weights.

32. A poise comprising a poise body, a cup detachably connected with the body, additional adjusting weights and means for securing said adjusting weights in central position with respect to the body and for detachably connecting the cup with the poise body.

33. In a poise, a poise body, additional adjusting weights detachably connected with said body, a member surrounding said adjusting weights adapted to lock the connecting means against release when a pressure is exerted from the outside on said surrounding member.

34. A poise comprising a poise body, a cup, additional adjusting weights in said cup, a screw for securing said cup detachably to the poise body, the head of said screw being substantially flush with the surface of the cup.

35. A poise comprising a poise body, additional adjusting weights, a cup for holding said additional adjusting weights and means operable from the lower end of the poise for removing or attaching the cup.

36. In a scale, a scale frame, a sheet metal platform, legs connected with the platform, scale levers and foot extensions on said legs, the foot extensions resting on elements in the scale levers.

37. In a scale platform, a leg extending from the platform, a steel foot mounted on said leg and means for adjusting the projecting end of said foot with respect to the leg.

38. In a scale platform, a leg extending from the platform, a steel foot mounted on said leg, means for adjusting the length of said steel foot with respect to the platform and means for locking the steel foot in adjusted position.

39. In a scale platform, the combination of a platform plate provided with depending flanges, a reinforcing plate on the lower side of said platform plate, four legs extending from the platform plate downwardly, feet attached to said tubular legs and means on one of said feet for bringing the same in a plane defined by the terminal surface of the other feet.

40. In a scale platform, a reinforcing plate connected with the back of the platform and a leg riveted to the platform and holding said reinforcing plate in position.

41. In a scale platform, a reinforcing plate, a leg provided with a shoulder engaging said platform and means for spacing said reinforcing plate from the platform at the portion where it is connected with the leg.

42. In a scale platform, the combination of a sheet metal plate, a leg riveted to the sheet metal plate, a washer surrounding the rivet portion of the leg and a reinforcing plate engaging a shoulder of the leg.

43. In a scale platform the combination of a sheet metal plate, a leg secured to said plate and a foot movably supported on the leg of the platform.

44. In a scale platform the combination of a sheet metal plate, a leg secured to the plate, a foot portion provided with an extension, the leg being provided with a spherical seat adapted to receive the end of an extension portion on the foot.

45. In a scale platform, the combination of a plate, a leg secured to the plate, a foot pivotally mounted on the leg, the leg being provided with a bore which permits a play of said foot with respect to the leg.

46. In a scale, hollow scale levers, knife edges secured on said scale levers, a platform detachably resting on said knife edges and means secured within the hollow space of the levers for maintaining the platform in central position with respect to the knife edges.

47. In a scale, scale levers, knife edges mounted on said scale levers, a platform, legs extending from said platform and resting on said knife edges and means mounted on the levers for preventing the contact of said legs with other parts of said scale levers.

48. In a scale, a plurality of scale levers having a hollow inner space, knife edges secured in said hollow inner space, a platform supported on said knife edges and means secured in said hollow inner space for preventing contact of portions of the platform with the scale levers.

49. In a scale, a scale lever having a channel shaped cross-section, knife edges secured to the walls of the channel, a scale platform resting on the knife edges and means disposed within the interior of the channel for preventing contact between elements secured to the scale platform and the walls of the scale lever.

50. In a scale, a scale lever, a knife edge mounted thereon, a scale platform and a clip mounted on the scale lever for limiting the length of the contact edge between the knife edge and elements secured to the scale platform.

51. In a scale, a scale lever having a hollow inner space, a knife edge mounted in said space, a resilient clip held within the space through which the knife edge projects, said clip having two opposite walls, a scale platform and feet connected with said platform detachably resting on said knife edge between the lateral walls of the clip.

52. In a scale, a scale lever having a hollow inner space, a knife edge secured in said hollow inner space, a scale platform, legs extending from said scale platform into the inner space and means frictionally secured within said inner space for preventing contact of said legs with wall portions of the scale lever.

53. In a scale, a scale lever having box shaped cross-section, a knife edge secured in the lateral walls of the box shaped lever, a platform, legs extending from said platform toward said knife edge, the lever being provided with an aperture above the knife edge through which one of said legs extends and means secured in the lever and below said aperture for preventing contact of said leg with wall portions of the lever.

54. In a scale, a frame, scale levers pivotally supported with respect to said frame, knife edges mounted in said scale levers, a cover plate closing the frame on top, a platform provided with legs resting on the said knife edges, the cover plate being provided with apertures for guiding said legs to proper position with respect to said knife edges.

Signed at Chicago, this third day of April 1914.

JAMES M. TRINER.

Witnesses:
HENRY BLECH,
OTTO GAWSY.